United States Patent
Torfs et al.

(10) Patent No.: US 12,072,407 B2
(45) Date of Patent: Aug. 27, 2024

(54) METHODS AND APPARATUSES FOR DISTANCE MEASUREMENT

(71) Applicant: Sony Corporation, Tokyo (JP)

(72) Inventors: Dimitri Torfs, Stuttgart (DE); Hugo Embrechts, Stuttgart (DE); Gonzalo Bailador del Pozo, Stuttgart (DE)

(73) Assignee: SONY CORPORATION, Tokyo (JP)

( * ) Notice: Subject to any disclaimer, the term of this patent is extended or adjusted under 35 U.S.C. 154(b) by 532 days.

(21) Appl. No.: 16/527,019

(22) Filed: Jul. 31, 2019

(65) Prior Publication Data
US 2020/0041633 A1    Feb. 6, 2020

(30) Foreign Application Priority Data
Aug. 6, 2018 (EP) .................................. 18187572

(51) Int. Cl.
*G01S 11/14*      (2006.01)
(52) U.S. Cl.
CPC .................................... *G01S 11/14* (2013.01)
(58) Field of Classification Search
None
See application file for complete search history.

(56) References Cited

U.S. PATENT DOCUMENTS

| | | | | |
|---|---|---|---|---|
| 5,828,301 | A * | 10/1998 | Sanchez | F41C 33/029 340/568.1 |
| 7,729,204 | B2 | 6/2010 | Peng et al. | |
| 9,042,906 | B1 | 5/2015 | Sushkov et al. | |
| 11,069,082 | B1 * | 7/2021 | Ebrahimi Afrouzi | G06T 7/70 |
| 2002/0028699 | A1 * | 3/2002 | Moquin | H04M 1/605 455/569.1 |
| 2003/0189488 | A1 * | 10/2003 | Forcier | G08B 13/1427 340/572.1 |
| 2009/0233551 | A1 | 9/2009 | Haartsen et al. | |

(Continued)

FOREIGN PATENT DOCUMENTS

| | | | | |
|---|---|---|---|---|
| CN | 102859563 | A * | 1/2013 | ......... G08B 13/1618 |
| ES | 2399461 | T3 * | 4/2013 | ............. G06F 21/35 |

(Continued)

OTHER PUBLICATIONS

Mayrhofer, Rene, Mike Hazas, and Hans Gellersen. "An authentication protocol using ultrasonic ranging." (2006). (Year: 2006).*

(Continued)

*Primary Examiner* — Isam A Alsomiri
*Assistant Examiner* — Jonathan D Armstrong
(74) *Attorney, Agent, or Firm* — XSENSUS LLP

(57) ABSTRACT

The present disclosure relates to a distance measurement system The system comprises a transmitter device and a receiver device. The transmitter device and the receiver device are clock-synchronized to each other. The transmitter device is configured to emit an ultrasonic signal at one or more predefined transmit times known to the transmitter and the receiver device. The receiver device is configured to receive the ultrasonic signal and to estimate a distance between the transmitter device and the receiver device based on the received ultra-sonic signal and the one or more predefined transmit times.

19 Claims, 3 Drawing Sheets

(56) References Cited

U.S. PATENT DOCUMENTS

| | | | | |
|---|---|---|---|---|
| 2011/0316847 | A1* | 12/2011 | Cheng | G06F 1/325 |
| | | | | 359/464 |
| 2013/0202108 | A1* | 8/2013 | Kao | H04L 9/0869 |
| | | | | 380/44 |
| 2014/0192622 | A1* | 7/2014 | Rowe | G01S 5/28 |
| | | | | 367/117 |
| 2015/0029880 | A1 | 1/2015 | Burns et al. | |
| 2015/0185015 | A1* | 7/2015 | Zukerman | H04L 67/51 |
| | | | | 701/522 |
| 2015/0379255 | A1* | 12/2015 | Konanur | H04W 12/33 |
| | | | | 726/19 |
| 2017/0019525 | A1 | 1/2017 | Hannon et al. | |
| 2017/0146644 | A1* | 5/2017 | Tucker | G02B 27/0172 |
| 2019/0261094 | A1* | 8/2019 | Greenlee | H04R 5/04 |
| 2019/0261135 | A1* | 8/2019 | Chen | H04W 4/029 |

FOREIGN PATENT DOCUMENTS

| | | | | | |
|---|---|---|---|---|---|
| GB | 2547919 | A | * | 9/2017 | ......... H04L 63/107 |
| JP | H0792265 | A | * | 4/1995 | ............ G01S 11/14 |
| JP | 2016207043 | A | * | 12/2016 | ......... G06Q 20/321 |
| KR | 20010015031 | A | * | 2/2001 | ....... H04L 12/40117 |
| KR | 20180110288 | A | * | 10/2018 | |
| WO | WO-0051280 | A2 | * | 8/2000 | ............ G06Q 20/10 |
| WO | 2011/042748 | A2 | | 4/2011 | |
| WO | 2013/108243 | A1 | | 7/2013 | |
| WO | WO-2016177671 | A1 | * | 11/2016 | ............ G06F 1/163 |
| WO | WO-2020163482 | A1 | * | 8/2020 | ......... H04B 13/005 |

OTHER PUBLICATIONS

Peng, Chunyi, et al. "Beepbeep: a high accuracy acoustic ranging system using cots mobile devices." Proceedings of the 5th international conference on Embedded networked sensor systems. 2007. (Year: 2007).*

Lazik, Patrick, et al. "Ultrasonic time synchronization and ranging on smartphones." 21st IEEE Real-Time and Embedded Technology and Applications Symposium. IEEE, 2015. (Year: 2015).*

Kasper Bonne Rasmussen et al: "Proximity-based access control for implantable medical devices", Computer and Communications Security, ACM, 2 Penn Plaza, Suite 701 New York NY 10121-0701 USA, Nov. 9, 2009 (Nov. 9, 2009), pp. 410-419, XP058271049.

Extended European Search Report issued Nov. 13, 2019 in European Application No. 19188628.2.

Lee et al., "Asynchronous Distance Measurement for Smartphone—Based Localization Exploiting Chirp Signals", Jul. 22-24, 2015, Coimbra, Portugal, 2 pages.

Hao et al., "WizSync: Exploiting Wi-Fi Infrastructure for Clock Synchronization in Wireless Sensor Networks", Department of Computer Science and Engineering, pp. 1-10.

Lazik et al., "Indoor Pseudo-ranging of Mobile Devices using Ultrasonic Chirps", SenSys'12, Nov. 6-9, 2012, Toronto, ON, Canada, 14 pages.

IEEE, "Part 11: Wireless LAN Medium Access Control (MAC) and Physical Layer (PHY) Specifications", IEEE Standard for Information technology—Telecommunications and information exchange between systems Local and metropolitan area networks—Specific requirements, IEEE Std 802.11™ 2016, Revision of IEEE Std 802.11-2012, New York, NY, USA, pp. 1-3532.

* cited by examiner

METHODS AND APPARATUSES FOR DISTANCE MEASUREMENT

CROSS-REFERENCE TO RELATED APPLICATION

The present application claims priority to European Patent Application 18187572.5 filed by the European Patent Office on Aug. 6, 2018, the entire contents of which being incorporated herein by reference.

FIELD

The present disclosure relates to methods and apparatuses for distance measurement between two or more devices.

BACKGROUND

A number of use cases are conceivable that rely on knowing a user is in proximity of a certain electronic device.

SUMMARY

Hence, it is desired to have an easy, cheap, and preferably secure way of determining that a device (e.g., a wearable, like a wristband) is close to another device (e.g., a mobile phone/pc/home agent). It also should be sufficiently accurate for the purpose of proximity detection between user devices. Preferably, no user action should be required, except maybe a one-time initialization/calibration process. Preferably, no additional hardware beyond what is already available should be required. It should be accurate enough such that it can be distinguished between closer than 2 meters and further away than 5 meter, for example. Further, it should not be easy to fool the system by making it think two devices are near to each other whereas they are actually not.

This need is met by methods and apparatuses in accordance with the independent claims. Advantageous embodiments are addressed by the dependent claims.

According to a first aspect, the present disclosure provides a distance measurement system. The system comprises a transmitter device and a receiver device. The transmitter device and the receiver device are clock-synchronized to each other. The transmitter device is configured to emit an ultrasonic signal at one or more predefined transmit times known to the transmitter and the receiver device. The receiver device is configured to receive the ultrasonic signal and to estimate or calculate a distance between the transmitter device and the receiver device based on the received ultrasonic signal and the one or more predefined transmit times.

According to a second aspect, the present disclosure provides a distance measurement method. The method includes clock-synchronizing a transmitter device and a receiver device. An ultrasonic signal is emitted by the transmitter device at one or more predefined transmit times known to the transmitter and the receiver device. The ultrasonic signal is received by the receiver device and a distance between the transmitter device and the receiver device is estimated or calculated based on the received ultrasonic signal and the one or more predefined transmit times.

According to a third aspect, the present disclosure provides a receiver device comprising a microphone configured to receive an ultrasonic signal emitted by a transmitter device at a predefined transmit time known to the receiver. The receiver device further comprises a processor configured to estimate or calculate a distance between the transmitter device and the receiver device based on the received ultrasonic signal and the predefined transmit time.

According to a fourth aspect, the present disclosure provides a method for a receiver device, the method including receiving, via a microphone, an ultrasonic signal emitted by a transmitter device at a predefined transmit time known to the receiver, and estimating or calculating a distance between the transmitter device and the receiver device based on the received ultrasonic signal and the predefined transmit time.

According to a further aspect, the present disclosure provides a transmitter device comprising a processor configured to encode a number of bits based on a current transmit time and a symmetric cryptographic key shared with a receiver device. The transmitter device also comprises transmit circuity configured to emit an ultrasonic signal at the current transmit time, wherein the ultrasonic signal is modulated based on the number of encoded bits.

According to yet a further aspect, the present disclosure provides a method for a transmitter device, the method comprising encoding a number of bits based on a current transmit tune and a symmetric cryptographic key shared with a receiver device. The method also includes emitting an ultrasonic signal at the current transmit time and the modulating ultrasonic signal based on the number of encoded bits.

Thus, solutions are described using the transmission and reception of (near-)ultrasound signals to achieve the above needs.

BRIEF DESCRIPTION OF THE FIGURES

Some examples of apparatuses and/or methods will be described in the following by way of example only, and with reference to the accompanying figures, in which.

DETAILED DESCRIPTION

Various examples will now be described more fully with reference to the accompanying drawings in which some examples are illustrated.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure.

For example, a user may wear a user-specific portable communication device, such as a wristband, a smartphone or the like, for identifying the user. An example use case would be the proximity of the user to a connected home agent enabling an intelligent personal assistant service. Suppose that both the user's portable communication device (e.g., wristband) and the home agent are connected to the same wireless network access point (e.g., wireless router). When the home agent detects that the user-specific portable communication device is nearby and being worn by the user, it can initiate communication, for example. Another example use case is the user's proximity to a personal computer (PC).

Suppose both the user-specific portable communication device and the PC are connected to the home/company wireless network. When the PC detects that the user-specific portable communication device is nearby and being worn by the user, the PC can be unlocked through a simple tapping on the user-specific portable communication device, for example. When the PC detects that the user-specific portable communication device moves away, the PC can be automatically locked. Yet a further example use case would be the proximity between a user's mobile phone and the user's wristband. Here, the mobile phone could check the proximity of the wristband (or vice versa) so it can decide to use it for collaborative authentication or not. For example, a payment with the user's wristband could be enabled because the mobile phone (on which the user is authenticated) is nearby.

Figure 1:
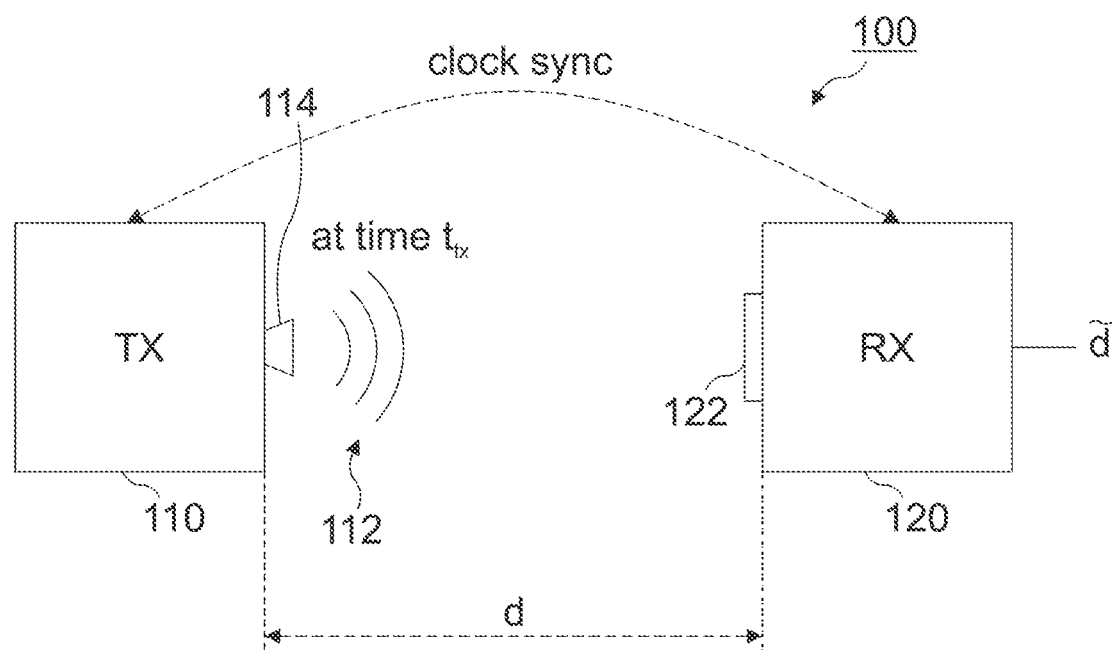
FIG. 1 shows a distance measurement system according to an embodiment.

FIG. 1 illustrates a basic setup of a distance measurement system 100 according to sent disclosure.

The system 100 comprises a transmitter device 110 and a receiver device 120. The transmitter device 110 and the receiver device 120 are clock-synchronized to each other. For example, the clock of the transmitter device 110 could be synchronized to the clock of the receiver device 120 with an accuracy of 1 ms, which means that the clocks do not deviate from each other by more than 1 ms. The skilled person having benefit from the present disclosure will appreciate however that the accuracy of the distance measurement depends on the synchronization accuracy, so that the synchronization accuracy should be chosen according to the desired accuracy of the distance measurement. As will be described below, the clock synchronization can be obtained in various possible ways.

The transmitter device 110 is configured to emit an ultrasonic signal 112 at one or more predefined transmit times $t_{tx}$ known to both the transmitter device 110 and the receiver device 120. Herein, an ultrasonic signal can be understood as an audio signal having a frequency range which is generally higher than the upper audible limit of humans. As used herein, an "ultrasonic signal" may include near-ultrasonic signals in a frequency range of 16 kHz to 20 kHz and/or ultrasonic signals of 20 kHz or above. For example, an ultrasonic signal in a frequency range of 20 kHz to 24 kHz may be used. In another example, near-ultrasonic signals slightly below 20 kHz, e. g. 19 kHz, may be used as signals above 20 kHz may be cut off by the processing circuitry of standard microphones. In order to emit the ultrasonic signal 112, the transmitter device 110 can comprise digital and analog signal generation circuitry, including digital signal processors (DSPs), digital-to-analog converter (DACs) and one or more loudspeakers 114, for example.

The receiver device 120 is configured to receive the ultrasonic signal 112 and to estimate or calculate a distance d between the transmitter device 110 and the receiver device 120 based on the received ultrasonic signal and the one or more known predefined transmit times $t_{tx}$. In order to receive the ultrasonic signal 112 and to estimate the distance d, the receiver device 120 can comprise digital and analog signal reception/detection circuitry, including one or more microphones 122, analog-to-digital converters (ADCs), and DSPs, for example.

Loudspeakers, microphones, DACs, and ADCs of present portable user devices, such as laptop computers, smartphones, smartwatches, smart wristbands and the like, are capable of generating and detecting ultrasonic signals having frequencies up to 24 kHz. Therefore, no modifications to existing hardware may be necessary with embodiments of the present disclosure.

In some embodiments, the transmitter device 110 can be a home agent, a PC, a smartphone or the like, while the receiver device 120 can be included in a wristband, a smartphone, or a similar portable device, for example. The skilled person having benefit from the present disclosure will appreciate that it could also be vice versa and that embodiments of the present disclosure are not limited to these examples.

In some embodiments, the transmitter device 110 can be configured to emit the ultrasonic signal 112 as a chirp signal. Compared to constant frequency ultrasonic signals or pulse signals, chirp signals can improve an achievable spatial resolution of the distance measurement system 100. The skilled person having benefit from the present disclosure will appreciate that a chirp signal is a linearly frequency modulated pulse that increases or decreases in frequency between two frequencies over time.

As has been mentioned before, the transmitter device 110 and the receiver device 120 need to be clock synchronized in order to coordinate otherwise independent clocks of the transmitter device 110 and the receiver device 120. Since the respective clocks may differ after some amount of time due to clock drift, caused by respective clocks counting time at slightly different oscillator rates, the transmitter device 110 and/or the receiver device 120 can furthermore be configured to periodically synchronize to a common clock reference. There are various alternatives of how the transmitter and receiver device clocks can be synchronized.

For example, when both devices 110, 120 are part of the same wireless network, such as a wireless local area network (WLAN), the transmitter device 110 and the receiver device 120 may be configured to synchronize to a common clock reference of the wireless network. The 802.11 standards require all Wi-Fi access points (APs) to broadcast periodic beacon frames for the purpose of network management. A beacon frame is one of the management frames in IEEE 802.11 based WLANs. It contains information about the network. Beacon frames are transmitted periodically, they serve to announce the presence of a wireless LAN and to synchronize the members of the service set. The transmitter device 110 and/or the receiver device 120 can detect the transmissions of such beacons and use them as a reference clock signal to synchronize their clocks. This approach can have some advantages. First, it does not require any modifications to existing 802.11 APs, and thus can leverage the ubiquitous Wi-Fi deployments. Second, measurements show that many production Wi-Fi APs have a communication range of hundreds of feet even in complex indoor environments. As a result, a large number of devices can synchronize to the same beacons without any message exchange.

Another option to synchronize the clocks of the devices 110, 120 is Wi-Fi CERTIFIED TimeSync™. The standards upon which Wi-Fi TimeSync is based include IEEE 802.11-2016 Timing Measurement protocol, IEEE 802.1AS-2011 generalized Precision Time protocol (gPTP), and the Wi-Fi Alliance defined Wi-Fi Peer-to-Peer (P2P) technical specification. The 802.11-2016 Timing Measurement protocol is invoked by the 802.1AS-2011 protocol to derive timestamps for time of departure and time of arrival, which are used to compute the time of flight between peers, and to determine a statistical relationship between the Wi-Fi subsystem clock (also known as the device clock) and the application clock. This relationship is used to extend the synchronization of the device clocks to the corresponding application clocks.

Yet a further option to synchronize the clocks of the devices 110, 120 would be to use the Network Time Protocol (NTP), which is a networking protocol for clock synchronization between computer systems over packet-switched, variable-latency data networks. Thus, an NTP server could be run on the transmitter device 110, to which the receiver device 120 synchronizes.

If both devices 110, 120 are not on the same wireless network, an external time provider could be used to clock synchronize both the transmitter device 110 and the receiver device 120. For example, the transmitter device 110 and/or the receiver device 120 can be configured to synchronize to a common clock reference of a global positioning system (GPS). In one example, the receiver device 120 can synchronize to a GPS based clock, while the transmitter device 110 can synchronize to a high-precision NTP server (Stratum 0). Various other options are conceivable.

In order to increase the accuracy of the distance measurement concept, an optional calibration can be performed initially. For this purpose, the transmitter device 110 and the receiver device 120 can be positioned close (e.g., within a few cm) to each other such that there is no significant travel time (time-of-flight) of the ultrasonic signal 112 between the two devices 110, 120. This calibration can basically measure the sound travel time (including signal processing latencies) for the zero-meter distance during calibration. In the following, we also call the sound travel time for zero-meter distance calibrated_time_for_zero_meter.

Optionally, the transmitter device 110 and the receiver device 120 can be configured to share a symmetric cryptographic key. Symmetric-key algorithms are algorithms for cryptography that use the same cryptographic keys for both encryption of plaintext and decryption of ciphertext. The keys may be identical or there may be a simple transformation to go between the two keys. The keys, in practice, represent a shared secret between two or more parties that can be used to maintain a private information link. If no protection against misuse is required, this can be omitted.

In the following, an embodiment of the distance measurement between transmitter device 110 and the receiver device 120 will be explained in more detail.

The transmitter device 110 transmits a number of (near-)ultrasonic chirps at specific predefined transmit times $t_{tx}$. Simple examples for a predefined transmit time $t_{tx}$ would be the start of a second, the start of a second+N*100 ms, N=0, 1, 2, 3, . . . , 9, or the start of a second+N*200 ms, N=0, 1, 2, . . . , 4. The skilled person having benefit from the present disclosure will appreciate that various other examples for predefined transmit times are possible and can be combined with each other. In one embodiment, it may be the transmitter device 110 that chooses the transmit times and optionally communicates them to the receiver device 120. As mentioned before, the predefined transmit time $t_{tx}$ (or its alternatives for different N) is also known to the clock synchronized receiver device 120. If the transmitter device 110 selects and/or varies the transmit times, it may share them with the receiver device 120. Sharing the predefined times can be done over an optionally secure channel between the devices.

In some embodiments related to replay protection, the transmitter device 110 can be configured to encode a number of bits based on a current transmit time $t_{tx}$ and the shared symmetric cryptographic key. In one example, the number of bits can be calculated as a function of the current transmit time $t_{tx}$ and the symmetric key shared earlier (we call this function f). The current time $t_{tx}$ can be a parameter of the function to be able to prevent replay attacks. The transmitter device 110 can then be configured to modulate the ultrasonic signal 112 with the chosen or calculated bits. Various modulation techniques are conceivable. In one example, the bits or symbols can be encoded as rate adjusted ultrasonic chirps, which rely on different rates of increasing/decreasing frequency over time to be identifiable by matched filtering.

Correspondingly, the receiver device 120 can be configured to calculate a number of bits (e.g. the same predefined bits as the transmitter device 110) from the known predefined transmit time $t_{tx}$ of the received ultrasonic signal and the shared symmetric cryptographic key and to compare the result to the number of bits encoded in the received ultrasonic signal. That is to say, the receiver device 120 can receive the (near-)ultrasonic chirps 112, can record the time $t_{rx}$ at which they are received and can check whether the received (near-ultrasonic chirps encode the expected bits. It can do so by estimating the time of transmission $t_{tx}$ (e.g. latest (start of a second+N*100 ms) before reception time $t_{rx}$) and calculating the function f as mentioned earlier. If the expected bits match the received bits, the receiver device 120 can deem the received (near-)ultrasonic chirps as being sent from the genuine sender it has paired with and can estimate the distance d based on:

$$d=(t_{rx}-t_{tx})-\text{calibrated\_time\_for\_zero\_meter}* \text{speed\_of\_sound}. \quad (1)$$

That is to say, the receiver device 120 can be configured to estimate the distance based on the reception time $t_{rx}$ of the received ultrasonic signal and at least the one or more predefined transmit times $t_{tx}$. The speed of sound is known to be approx. 343 m/s in dry air at 20° C.

Figure 2:
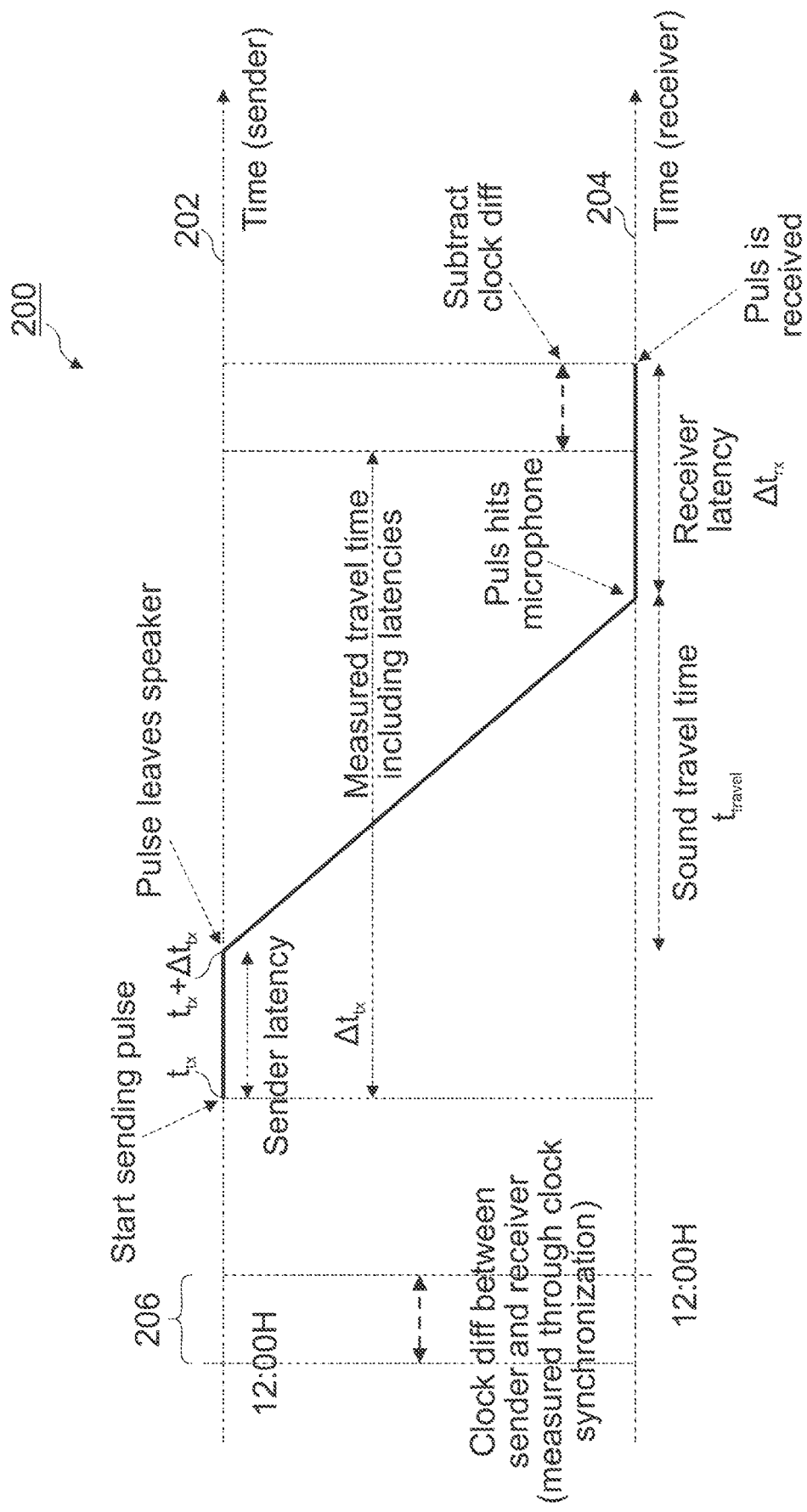
FIG. 2 illustrates the distance measurement in more detail.

FIG. 2 visualizes an example of the proposed distance measurement concept in more detail.

Reference sign 202 refers to the time domain of transmitter device 110, while reference sign 204 refers to the time domain of receiver device 120. A clock difference 206 between the transmitter clock and the receiver clock can be determined and removed via clock synchronization between transmitter device 110 and receiver device 120. At predefined time $t_{tx}$ the transmitter device 110 starts generating and sending the ultrasonic signal 112. Due to some signal propagation delays $\Delta t_{tx}$ in the transmitter device 110, the ultrasonic signal 112 leaves the transmitter device's loudspeaker at time $t_{tx}+\Delta t_{tx}$. After a sound travel time $t_{travel}$ the ultrasonic signal 112 hits the receiver device's microphone at time $t_{rx}-\Delta t_{rx}$ ($\Delta t_{rx}$: signal propagation delay in receiver device) and is finally detected at time $t_{rx}$. Thus, calibrated_time_for_zero_meter in Equation (1) takes into account the respective signal propagation delays $\Delta t_{tx}$ and $\Delta t_{rx}$.

After the distance d has been calculated according to Equation (1), the transmitter device 110 and/or the receiver device 120 can be configured to detect that the transmitter device and the receiver device are near to each other (if the estimated distance is below a predefined threshold) and, if so, to initiate one or more further actions. As described before, such further action could be that access can be granted to the one or the other of the devices, or to a third device. The result could be sent to another device (from receiver to transmitter or a third device). Also, the further action could be a mutual communication, unlocking of a PC, or another action such as authentication or the like.

Figure 3:
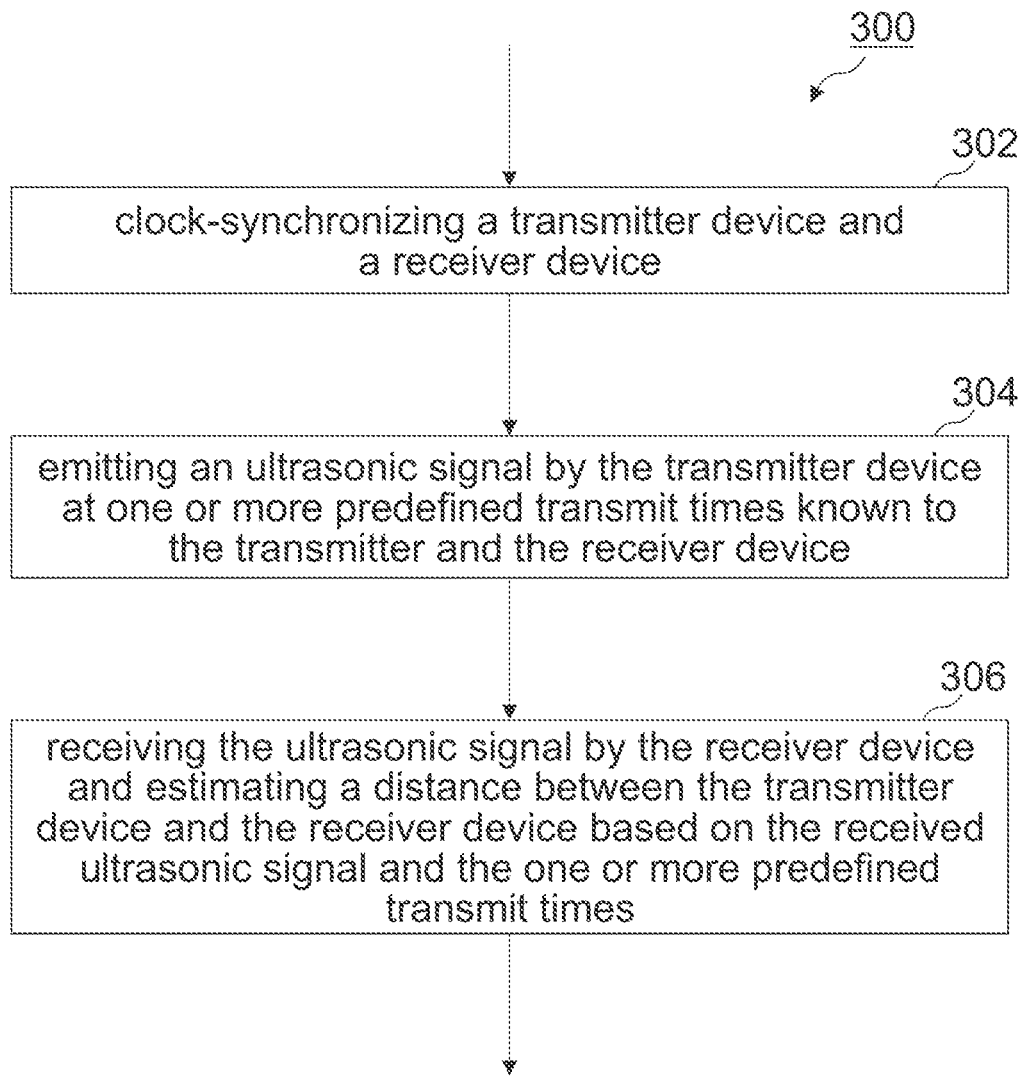
FIG. 3 shows a distance measurement method according to an embodiment.

To summarize the proposed concept, FIG. 3 shows a schematic flowchart of a distance measurement method 300 according to the present disclosure.

At 302, the method includes clock-synchronizing a transmitter device and a receiver device. At 304, an ultrasonic signal is emitted by the transmitter device at one or more predefined transmit times known to the transmitter and the receiver device. At 306, the ultrasonic signal is received by the receiver device and a distance between the transmitter device and the receiver device is estimated based on the received ultrasonic signal and the one or more predefined transmit times.

The following examples pertain to further embodiments.

(1) Distance measurement system, comprising:
a transmitter device and a receiver device,
wherein the transmitter device and the receiver device are clock-synchronized to each other;
wherein the transmitter device is configured to emit an ultrasonic signal at one or more predefined transmit times known to the transmitter and the receiver device;
wherein the receiver device is configured to receive the ultrasonic signal and to estimate/calculate a distance between the transmitter device and the receiver device based on the received ultrasonic signal and the one or more predefined transmit times.

(2) The distance measurement system of (1), wherein the transmitter device is configured to emit the ultrasonic signal in a frequency range between 16-20 kHz.

(3) The distance measurement system of (1) or (2), wherein the transmitter device is configured to emit the ultrasonic signal as a chirp signal.

(4) The distance measurement system of any one of (1) to (3), wherein the transmitter device and/or the receiver device is configured to periodically synchronize to a common clock reference.

(5) The distance measurement system of any one of (1) to (4), wherein the transmitter device and/or the receiver device are configured to synchronize to a common clock reference of a wireless network.

(6) The distance measurement system of any one of (1) to (5), wherein the transmitter device and the receiver device are configured to synchronize to a common clock reference of a global positioning system.

(7) The distance measurement system of any one of (1) to (6), wherein the transmitter device and the receiver device are configured to share a symmetric cryptographic key.

(8) The distance measurement system of (7), wherein the transmitter device is configured to encode a number of bits based on a current transmit time and the symmetric cryptographic key and to modulate the ultrasonic signal based on the encoded bits.

(9) The distance measurement system of (8), wherein the receiver device is configured to encode a number of bits based on an estimated transmit time of the received ultrasonic signal and the symmetric cryptographic key and to compare the result to the number of encoded bits of the received ultrasonic signal.

(10) The distance measurement system of any one of (1) to (9), wherein the receiver device is configured to estimate the distance based on a reception time of the received ultrasonic signal and the one or more predefined transmit times.

(11) The distance measurement system of any one of (1) to (10), wherein the transmitter device and/or the receiver device are configured to detect that the transmitter device and the receiver device are near to each other if the estimated distance is below a predefined threshold. If it is detected that the transmitter device and the receiver device are near to each other, a further action may be initiated. For example, this action may be one or more of the following: Initiating communication between the transmitter device and the receiver device, allowing a user authenticated on the transmitter device or the receiver device access to the other of the transmitter device or the receiver device or transfer the authentication of the user authenticated on one of the transmitter device and receiver device to the other of the transmitter or the receiver device, using the detected nearness as part of a multi-factor user authentication.

(12) The distance measurement system of any one of (1) to (11), wherein the transmitter device and the receiver device are user devices, and wherein the transmitter device and/or the receiver device is a mobile or wearable device.

(13) A receiver device, comprising a microphone configured to receive an ultrasonic signal emitted by a transmitter device at a predefined transmit time and a processor configured to estimate/calculate a distance between the transmitter device and the receiver device based on the received ultrasonic signal and the predefined transmit time.

(14) The receiver device of (13), further comprising clock synchronization circuitry configured to synchronize a clock of the receiver device to a clock of the transmitter device.

(15) The receiver device of (13) or (14), wherein the processor is configured to encode a number of bits based on an estimated transmit time of the received ultrasonic signal and a symmetric cryptographic key and to compare the result to a number of encoded bits conveyed by the received ultrasonic signal.

(16) A transmitter device, comprising a processor configured to encode a number of bits based on a current transmit time and a symmetric cryptographic key shared with a receiver device; and transmit circuity configured to emit an ultrasonic signal at the current transmit time, wherein the ultrasonic signal is modulated based on the number of encoded bits.

(17) The transmitter device of (16), wherein the current transmit time is a predefined time.

(18) The transmitter device of (16) or (17), further comprising clock synchronization circuitry configured to synchronize a clock of the transmitter device to a clock of the receiver device.

(19) A transmitter device, comprising a processor configured to define one or more transmit times for transmitting an ultrasonic signal to a receiver; and transmit circuity configured to share the one or more predefined transmit times with the receiver.

(20) A distance measurement method. The method includes clock-synchronizing a transmitter device and a receiver device. An ultrasonic signal is emitted by the transmitter device at one or more predefined transmit times known to the transmitter and the receiver device. The ultrasonic signal is received by the receiver device and a distance between the transmitter device and the receiver device is estimated based on the received ultrasonic signal and the one or more predefined transmit times.

(21) A method for a receiver device. The method includes receiving, via a microphone, an ultrasonic signal emitted by a transmitter device at a predefined transmit time, and estimating a distance between the transmitter device and the receiver device based on the received ultrasonic signal and the predefined transmit time.

(20) A method for a transmitter device. The method includes encoding a number of bits based on a current transmit time and a symmetric cryptographic key shared with a receiver device. The method also includes emitting an ultrasonic signal at the current transmit time and the modulating ultrasonic signal based on the number of encoded bits.

The aspects and features mentioned and described together with one or more of the previously detailed examples and figures, may as well be combined with one or more of the other examples in order to replace a like feature of the other example or in order to additionally introduce the feature to the other example.

Examples may further be or relate to a computer program having a program code for performing one or more of the above methods, when the computer program is executed on a computer or processor. Steps, operations or processes of various above-described methods may be performed by programmed computers or processors. Examples may also cover program storage devices such as digital data storage media, which are machine, processor or computer readable and encode machine-executable, processor-executable or computer-executable programs of instructions. The instructions perform or cause performing some or all of the acts of the above-described methods. The program storage devices may comprise or be, for instance, digital memories, magnetic storage media such as magnetic disks and magnetic tapes, hard drives, or optically readable digital data storage media. Further examples may also cover computers, processors or control units programmed to perform the acts of the above-described methods or (field) programmable logic arrays ((F)PLAs) or (field) programmable gate arrays ((F)PGAs), programmed to perform the acts of the above-described methods.

The description and drawings merely illustrate the principles of the disclosure. Furthermore, all examples recited herein are principally intended expressly to be only for pedagogical purposes to aid the reader in understanding the principles of the disclosure and the concepts contributed by the inventor(s) to furthering the art. All statements herein reciting principles, aspects, and examples of the disclosure, as well as specific examples thereof, are intended to encompass equivalents thereof.

A functional block denoted as "means for . . . " performing a certain function may refer to a circuit that is configured to perform a certain function. Hence, a "means for s.th." may be implemented as a "means configured to or suited for s.th.", such as a device or a circuit configured to or suited for the respective task.

Functions of various elements shown in the figures, including any functional blocks labeled as "means", "means for providing a signal", "means for generating a signal.", etc., may be implemented in the form of dedicated hardware, such as "a signal provider", "a signal processing unit", "a processor", "a controller", etc. as well as hardware capable of executing software in association with appropriate software. When provided by a processor, the functions may be provided by a single dedicated processor, by a single shared processor, or by a plurality of individual processors, some of which or all of which may be shared. However, the term "processor" or "controller" is by far not limited to hardware exclusively capable of executing software, but may include digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

A block diagram may, for instance, illustrate a high-level circuit diagram implementing the principles of the disclosure. Similarly, a flow chart, a flow diagram, a state transition diagram, a pseudo code, and the like may represent various processes, operations or steps, which may, for instance, be substantially represented in computer readable medium and so executed by a computer or processor, whether or not such computer or processor is explicitly shown. Methods disclosed in the specification or in the claims may be implemented by a device having means for performing each of the respective acts of these methods.

It is to be understood that the disclosure of multiple acts, processes, operations, steps or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples a single act, function, process, operation or step may include or may be broken into multiple sub-acts. -functions. -processes, -operations or -steps, respectively. Such sub acts may be included and part of the disclosure of this single act unless explicitly excluded.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim.

The invention claimed is:

1. A distance measurement system, consisting of:
   an electronic device having a first transmitter and a first receiver; and
   a wearable electronic device having a second transmitter and a second receiver, the wearable electronic device being different from the electronic device,
   wherein the first transmitter and the second receiver are clock-synchronized to each other,
   wherein the first transmitter is configured to emit an ultrasonic signal at a plurality of predefined transmit times, the predefined transmit times being known to the first transmitter and the second receiver at an initial time of emitting the ultrasonic signal, the predefined transmit times each being a multiple of 100 ms,
   wherein the second receiver is configured to receive the ultrasonic signal and to calculate a distance between the first transmitter and the second receiver based on the received ultrasonic signal and the known predefined transmit times,
   wherein the first transmitter and the second receiver are configured to share a symmetric cryptographic key prior to emitting the ultrasonic signal,
   wherein the electronic device is configured to encode a first number of bits based on a current transmit time and the shared symmetric cryptographic key and to modulate the ultrasonic signal based on the encoded bits,
   wherein the wearable device is configured to
      calculate a second number of bits based on the known predefined transmit time of the received ultrasonic signal and the shared symmetric cryptographic key, and
      compare the calculated second number of bits to the encoded first number of bits of the received ultrasonic signal, and
   wherein the electronic device is configured to, responsive to detection of the wearable electronic device being worn and being within a predetermined distance away from the electronic device, unlock the electronic device for use by a user.

2. The distance measurement system of claim 1, wherein the first transmitter is configured to emit the ultrasonic signal in a frequency range between 16-20 KHz.

3. The distance measurement system of claim 1, wherein the first transmitter is configured to emit the ultrasonic signal as a chirp signal.

4. The distance measurement system of claim 1, wherein the first transmitter and/or the second receiver are configured to periodically synchronize to a common clock reference.

5. The distance measurement system of claim 1, wherein the first transmitter and/or the second receiver are configured to synchronize to a common clock reference of a wireless network.

6. The distance measurement system of claim 1, wherein the first transmitter and/or the second receiver are configured to synchronize to a common clock reference of a global positioning system.

7. The distance measurement system of claim 1, wherein the wearable electronic device is configured to estimate the distance based on a reception time of the received ultrasonic signal and a corresponding one of the predefined transmit times.

8. The distance measurement system of claim 1, wherein the electronic device and/or the wearable electronic device are configured to detect that the first transmitter and the second receiver are within the predetermined distance away from each other in a case where the estimated distance is below a predefined threshold.

9. The distance measurement system of claim 1, wherein in a case where the first number of bits matches the second number of bits, the second receiver authenticates the emitted ultrasonic signal.

10. The distance measurement system of claim 1, wherein
the electronic device having the first transmitter is a mobile electronic device, and
the mobile electronic device determines to use collaborative authentication with the wearable electronic device responsive to the detection of the wearable electronic device being worn by the user and being within a predetermined range from the mobile electronic device based on the calculated distance.

11. The distance measurement system of claim 1, wherein the electronic device determines to lock itself from access by the user responsive to the electronic device determining that the wearable electronic device moves from within a predetermined distance away from the electronic device to outside of the predetermined distance away from the electronic device.

12. The distance measurement system of claim 1, wherein the ultrasonic signal is transmitted directly from the first transmitter to the second receiver.

13. The distance measurement system of claim 1, wherein the first number of bits is a function of the current transmit time and the shared symmetric cryptographic key, with the current transmit time being a parameter of the function to prevent replay attacks.

14. A distance measurement method consisting of communication between an electronic device and a wearable electronic device, the electronic device having a first transmitter and a first receiver and the wearable electronic device having a second transmitter and a second receiver, comprising:
clock-synchronizing the first transmitter and the second receiver to each other;
sharing, by the first transmitter and the second receiver, a symmetric cryptographic key;
encoding, by the first transmitter, a first number of bits based on a current transmit time and the shared symmetric cryptographic key and modulating, by the first transmitter, an ultrasonic signal based on the encoded bits;
after said encoding, emitting the ultrasonic signal by the first transmitter at a plurality of predefined transmit times known to the first transmitter and the second receiver at least at an initial time of emitting the ultrasonic signal, the predefined transmit times each being a multiple of 100 ms;
receiving the ultrasonic signal by the second receiver;
calculating, by the second receiver, a second number of bits based on an estimated transmit time of the received ultrasonic signal and the shared symmetric cryptographic key, and comparing, by the second receiver, the calculated second number of bits to the encoded first number of bits of the received ultrasonic signal; and
calculating, using the wearable electronic device, a distance between the first transmitter and the second receiver based on the received ultrasonic signal and the predefined transmit times,
wherein said sharing the symmetric cryptographic key is performed prior to said emitting the ultrasonic signal,
wherein the first transmitter is part of the electronic device,
wherein the second receiver is part of the wearable electronic device, and
wherein the method further comprises:
detecting that the wearable electronic device is being worn by a user and within a predetermined distance away from the electronic device; and
responsive to the wearable device being worn by the user and being within the predetermined distance away from the electronic device, and responsive to a physical input from the user to the electronic device, unlocking the electronic device.

15. The method of claim 14, further comprising authenticating, by the second receiver, the emitted ultrasonic signal responsive to the first number of bits matching the second number of bits.

16. The method of claim 14, wherein
the electronic device having the first transmitter is a mobile electronic device different from the wearable electronic device, and
the method further comprises the mobile electronic device determining to use collaborative authentication with the wearable electronic device responsive to the mobile electronic device detecting that the wearable electronic device is worn by the user and is within the predetermined range from the mobile electronic device based on the calculated distance.

17. The method of claim 14, wherein the method further comprises locking the electronic device from access by the user responsive to determination that the wearable electronic device moves from within the predetermined distance away from the electronic device to outside of the predetermined distance away from the electronic device.

18. The method of claim 14, wherein the ultrasonic signal received by the second receiver directly from the first transmitter.

19. The method of claim 14, wherein the first number of bits is a function of the current transmit time and the shared symmetric cryptographic key, with the current transmit time being a parameter of the function to prevent replay attacks.

* * * * *